(12) United States Patent
Auner et al.

(10) Patent No.: US 10,479,404 B2
(45) Date of Patent: Nov. 19, 2019

(54) BACKUP SYSTEM FOR A VEHICLE WITH A TRAILER HITCH

(71) Applicants: Toyota Motor Engineering & Manufacturing North America, Inc., Plano, TX (US); Toyota Jidosha Kabushiki Kaisha, Toyota-shi, Aichi-ken (JP)

(72) Inventors: David B. Auner, South Lyon, MI (US); Yuhei Oka, Toyota (JP)

(73) Assignees: Toyota Motor Engineering & Manufacturing North America, Inc., Plano, TX (US); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/919,922

(22) Filed: Mar. 13, 2018

(65) Prior Publication Data
US 2019/0283803 A1  Sep. 19, 2019

(51) Int. Cl.
| | | |
|---|---|---|
| *B62D 15/02* | (2006.01) |
| *B60R 1/00* | (2006.01) |
| *G08G 1/16* | (2006.01) |
| *H04N 7/18* | (2006.01) |
| *H04N 5/232* | (2006.01) |

(52) U.S. Cl.
CPC ......... *B62D 15/0275* (2013.01); *B60R 1/003* (2013.01); *G08G 1/168* (2013.01); *H04N 5/23293* (2013.01); *H04N 7/183* (2013.01); *B60R 2300/808* (2013.01); *B60R 2300/8066* (2013.01); *B60R 2300/8086* (2013.01)

(58) Field of Classification Search
CPC ........... B62D 15/0275; H04N 5/23293; H04N 7/183; G08G 1/168; B60R 1/003; B60R 2300/808; B60R 2300/8066; B60R 2300/8086
See application file for complete search history.

(56) References Cited

U.S. PATENT DOCUMENTS 6,411,867 B1  6/2002  Sakiyama et al.
9,566,911 B2 *  2/2017  Greenwood .............. B60R 1/00
(Continued)

OTHER PUBLICATIONS

Screenshots from "Ford Dynamic Hitch Assist," available for viewing at https://www.youtube.com/watch?v=JgPTe-ZM9sk (accessed on Mar. 13, 2018).

*Primary Examiner* — Joseph Suh
(74) *Attorney, Agent, or Firm* — Christopher G. Darrow; Darrow Mustafa PC

(57) ABSTRACT

A vehicle includes upright sides, a hitch point between the upright sides, an interior display, and a control module communicatively connected with the display. The control module is configured to, in response to a backup event, operate the display during the backup event to display an area behind the vehicle, general-purpose steering guidelines, and a trailer-hitching steering guideline. The general-purpose steering guidelines lead from the upright sides, indicate a projected locus of the vehicle, and have a reach that is maintained regardless of changing steering angles. The trailer-hitching steering guideline leads from the hitch point, indicates a projected path of the hitch point, and has a reach that is adjusted based on changing steering angles.

16 Claims, 5 Drawing Sheets

(56) References Cited

U.S. PATENT DOCUMENTS

| | | | | |
|---|---|---|---|---|
| 2001/0027363 | A1* | 10/2001 | Shimazaki | B60R 1/00 |
| | | | | 701/41 |
| 2002/0145662 | A1* | 10/2002 | Mizusawa | B60D 1/36 |
| | | | | 348/118 |
| 2009/0236825 | A1* | 9/2009 | Okuda | B60D 1/36 |
| | | | | 280/477 |
| 2010/0265048 | A1* | 10/2010 | Lu | B60Q 9/005 |
| | | | | 340/435 |
| 2016/0023601 | A1* | 1/2016 | Windeler | B60R 1/00 |
| | | | | 348/118 |
| 2017/0073003 | A1* | 3/2017 | Shepard | B62D 13/06 |

* cited by examiner

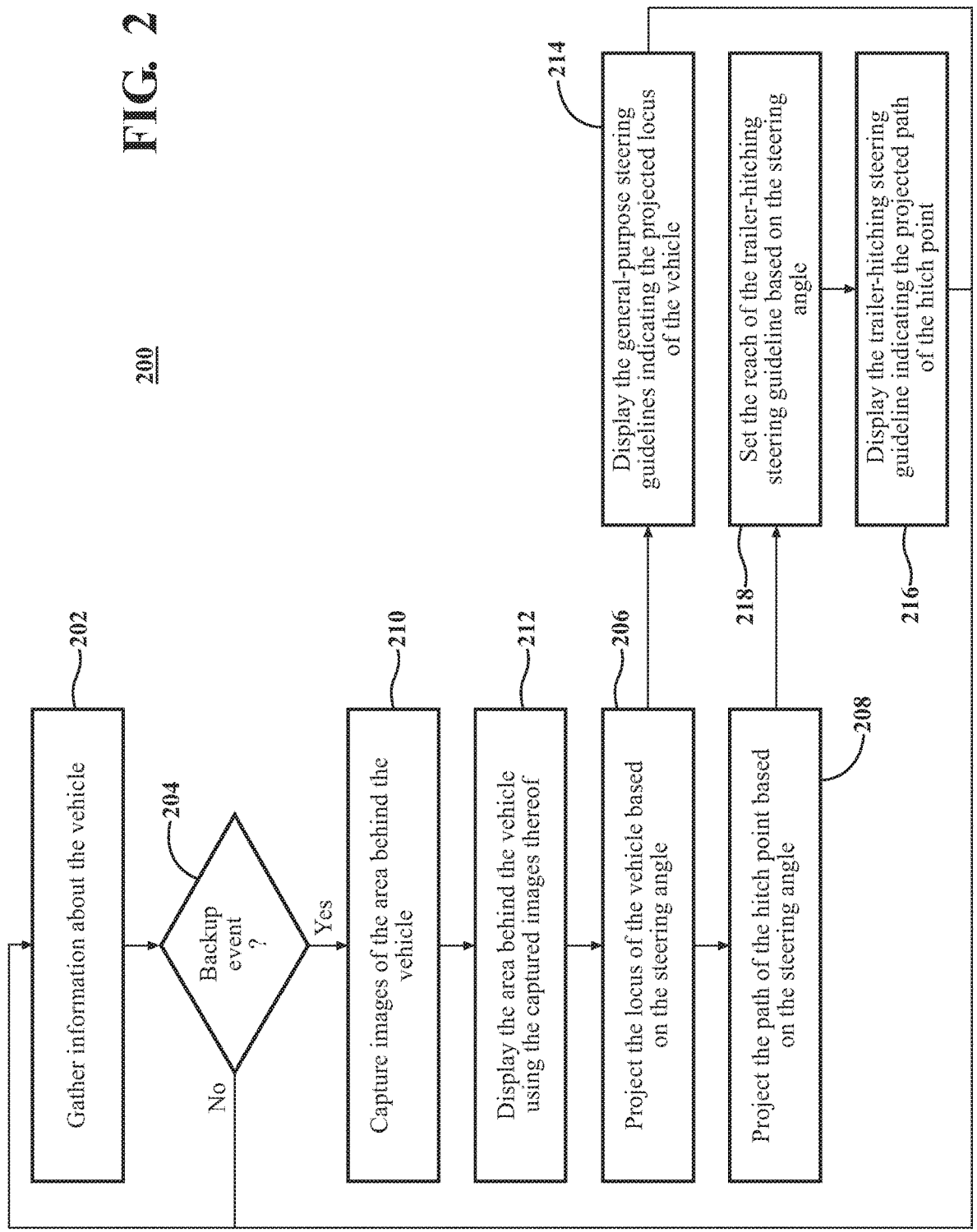

BACKUP SYSTEM FOR A VEHICLE WITH A TRAILER HITCH

TECHNICAL FIELD

The embodiments disclosed herein relate to backup systems for vehicles and, more particularly, to backup systems for vehicles with a trailer hitch.

BACKGROUND

Many of today's vehicles are equipped with a backup system. During backup events, the backup systems add rear visibility. Typically, in relation to the rear visibility, the backup systems also issue steering guidance. In addition to issuing general-purpose steering guidance, some backup systems for vehicles with a trailer hitch issue trailer-hitching steering guidance.

SUMMARY

Disclosed herein are embodiments of a backup system, and elements thereof, for a vehicle with a trailer hitch. During backup events, the backup system uses a display to issue steering guidance, including trailer-hitching steering guidance. In one aspect, a vehicle includes upright sides, a hitch point between the upright sides, an interior display, and a control module communicatively connected with the display. The control module is configured to, in response to a backup event, operate the display during the backup event to display an area behind the vehicle, general-purpose steering guidelines, and a trailer-hitching steering guideline. The general-purpose steering guidelines lead from the upright sides, indicate a projected locus of the vehicle, and have a reach that is maintained regardless of changing steering angles. The trailer-hitching steering guideline leads from the hitch point, indicates a projected path of the hitch point, and has a reach that is adjusted based on changing steering angles.

In another aspect, a backup system for a vehicle with a trailer hitch includes at least one processor, and a memory communicatively coupled to the at least one processor and storing a control module. The control module includes instructions that when executed by the at least one processor cause the at least one processor to monitor for backup events in a vehicle with upright sides and a hitch point between the upright sides, and in response to identifying a backup event, operate an interior display in the vehicle during the backup event to display an area behind the vehicle, general-purpose steering guidelines, and a trailer-hitching steering guideline. The general-purpose steering guidelines lead from the upright sides, indicate a projected locus of the vehicle, and have a reach that is maintained regardless of changing steering angles. The trailer-hitching steering guideline leads from the hitch point, indicates a projected path of the hitch point, and has a reach that is adjusted based on changing steering angles.

In yet another aspect, a vehicle includes upright sides, a hitch point between the upright sides, an interior display, and a control module communicatively connected with the display. The control module is configured to, in response to a backup event, operate the display during the backup event to display an area behind the vehicle, and a trailer-hitching steering guideline. The trailer-hitching steering guideline leads from the hitch point, indicates a projected path of the hitch point, and has, from a baseline reach at an on-center steering angle, an increasingly longer reach at increasingly off-center steering angles.

These and other aspects will be described in additional detail below.

BRIEF DESCRIPTION OF THE DRAWINGS

The various features, advantages and other uses of the present embodiments will become more apparent by referring to the following detailed description and drawing in which:

FIG. 2 is a flowchart showing the operations of a process for operating the backup system, including operating the display during backup events to add rear visibility and, in relation to the rear visibility, issue steering guidance.

DETAILED DESCRIPTION

This disclosure teaches a vehicle with a trailer hitch whose backup system is operable to display an adjustable-reach trailer-hitching steering guideline indicating a projected path of a hitch point during backup events. The trailer-hitching steering guideline informs a user's steering wheel operation during the performance of the backup events. At increasingly off-center steering angles, commensurately with the increasing difficulty of a user's realization of the correct steering angle for completing the backup events via steering wheel operation, the trailer-hitching steering guideline has an increasingly longer reach.

Vehicle with a Trailer Hitch and a Backup System

Figure 1:
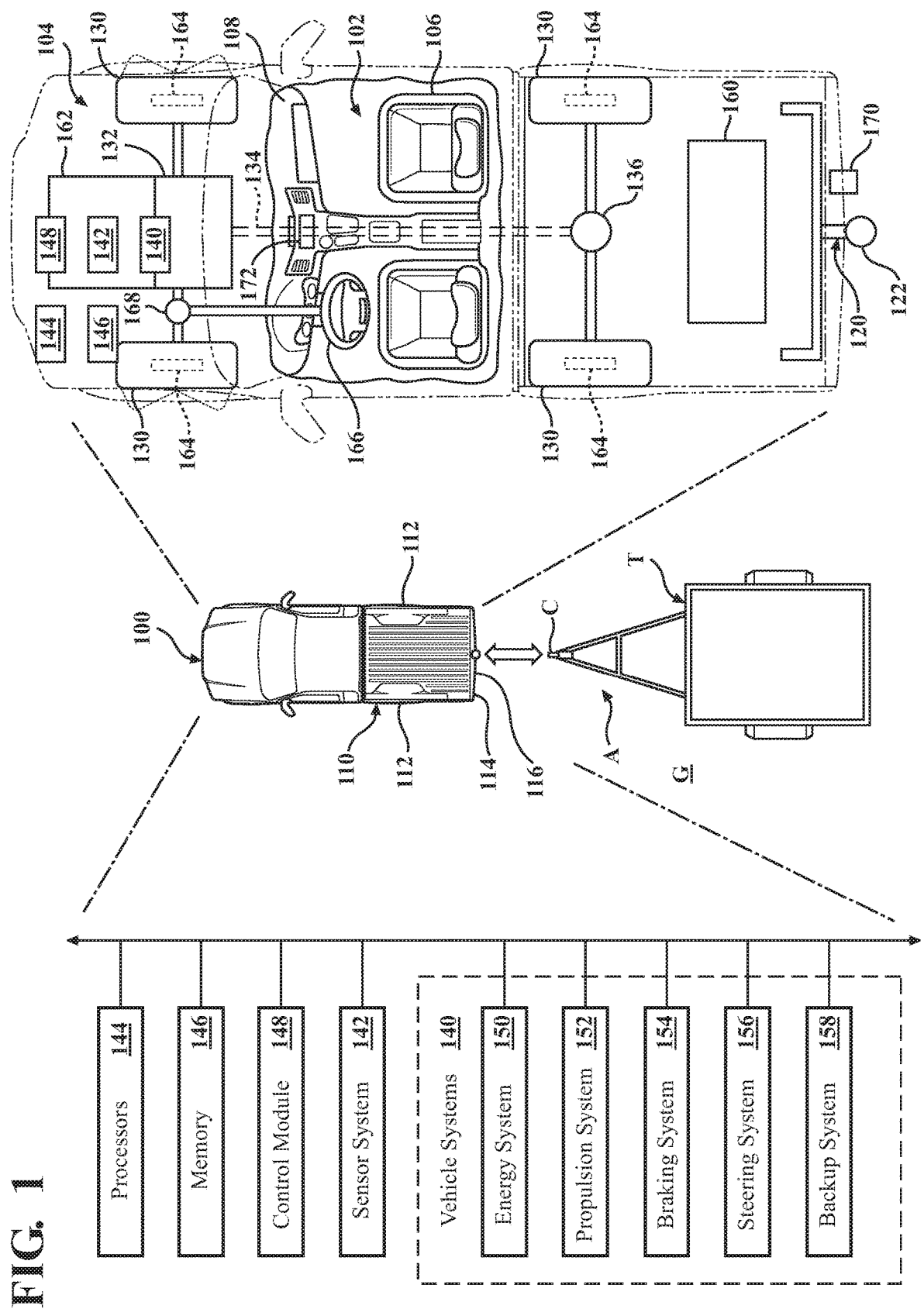
FIG. 1 is a portrayal of a vehicle using top views and block diagrams, showing a trailer hitch, as well as vehicle systems, a sensor system and a control module, with the vehicle systems including a steering system and a backup system with a display.

A representative vehicle 100 is shown in FIG. 1. In this description, uses of "front," "forward" and the like, and uses of "rear," "rearward" and the like, refer to the longitudinal direction of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral direction of the vehicle 100, with "driver's side" and the like referring to the left side of the vehicle 100, and "passenger side" and the like referring to the right side of the vehicle 100.

The vehicle 100 has an exterior and a number of interior compartments. The compartments include a passenger compartment 102 and an engine compartment 104. The vehicle 100 may include, among other things, seats 106 and a dash assembly 108 housed in the passenger compartment 102.

The vehicle 100 has a body 110 that forms its exterior and defines its compartments. The body 110 has upright sides 112 and a rear end 114 with a laterally-extending rear bumper 116, as well as a front end, a floor, a roof and the like.

For purposes of hitching a representative trailer T to the vehicle 100, the vehicle 100 includes a trailer hitch 120. The trailer hitch 120 is part of, mounted to or otherwise supported by the body 110. The trailer hitch 120 includes a culminating, laterally-central hitch point 122 between the upright sides 112. The trailer hitch 120, as shown, is supported by the rear end 114 of the body 110, and the hitch point 122 is rendered by a hitch ball projecting from the body 110 adjacent the bumper 116. In relation to the trailer hitch 120, the trailer T includes a trailer coupler C. The hitch point 122 and the trailer coupler C are selectively mechanically connectable to one another. With the hitch point 122 and the trailer coupler C mechanically connected to one another, the trailer T is hitched to the vehicle 100. With the trailer T hitched to the vehicle 100, the vehicle 100 is operable to pull the trailer T and any onboard cargo.

The vehicle 100 has a drivetrain. The drivetrain is part of, mounted to or otherwise supported by the body 110. The drivetrain may be housed, in whole or in part, in any combination of the passenger compartment 102, the engine compartment 104 or elsewhere in the vehicle 100. As part of the drivetrain, the vehicle 100 includes wheels 130. The wheels 130 support the remainder of the vehicle 100 on the ground G. The vehicle 100 includes four wheels 130, two of which are front wheels 130, and two of which are rear wheels 130. One, some or all of the wheels 130 are powered to drive the vehicle 100 along the ground G. In a rear-wheel drive arrangement, one, some or all of the rear wheels 130 are powered to drive the vehicle 100 along the ground G. For this purpose, also as part of the drivetrain, in addition to the wheels 130, the vehicle 100 includes any penultimate combination of a transmission 132 with a reverse transmission gear and one or more forward transmission gears, a drive shaft 134, a differential 136 and the like, to which the wheels 130 are mechanically connected.

The vehicle 100 operates as an assembly of interconnected items that equip the vehicle 100 to perform vehicle functions. For purposes of performing vehicle functions, the vehicle 100 includes one or more vehicle systems 140. Either alone or in conjunction with the drivetrain, the vehicle systems 140 are operable to perform vehicle functions on behalf of the vehicle 100. Any combination of the vehicle systems 140 may be operable to perform a vehicle function. Accordingly, from the perspective of a vehicle function, one, some or all of the vehicle systems 140 serve as associated vehicle systems 140. Moreover, each vehicle system 140 may be operable to perform any combination of vehicle functions, in whole or in part. Accordingly, each vehicle system 140, from its own perspective, serves as an associated vehicle system 140 for one or more vehicle functions.

In addition to the vehicle systems 140, the vehicle 100 includes a sensor system 142, as well as one or more processors 144, memory 146, and a control module 148 to which the vehicle systems 140 and the sensor system 142 are communicatively connected. The sensor system 142 is operable to detect information about the vehicle 100. The processors 144, the memory 146 and the control module 148 together serve as a computing device whose control module 148 is employable to orchestrate the operation of the vehicle 100.

Specifically, the control module 148 operates the vehicle systems 140 based on information about the vehicle 100. Accordingly, as a prerequisite to operating the vehicle systems 140, the control module 148 gathers information about the vehicle 100, including the information about the vehicle 100 detected by the sensor system 142. The control module 148 then evaluates the information about the vehicle 100, and operates the vehicle systems 140 based on its evaluation.

Vehicle Systems.

The vehicle systems 140 are part of, mounted to or otherwise supported by the body 110. The vehicle systems 140 may be housed, in whole or in part, in any combination of the passenger compartment 102, the engine compartment 104 or elsewhere in the vehicle 100. Each vehicle system 140 includes one or more vehicle elements. On behalf of the vehicle system 140 to which it belongs, each vehicle element is operable to perform, in whole or in part, any combination of vehicle functions with which the vehicle system 140 is associated. It will be understood that the vehicle elements, as well as the vehicle systems 140 to which they belong, may but need not be mutually distinct.

The vehicle systems 140 include an energy system 150 and a propulsion system 152. The energy system 150 and the propulsion system 152 are connected to one another. Moreover, the drivetrain is mechanically connected to the propulsion system 152. The propulsion system 152 and the drivetrain together serve as a powertrain for the vehicle 100. The energy system 150 is operable to perform one or more energy functions, including but not limited to storing and otherwise handling energy. The propulsion system 152 is operable to perform one or more propulsion functions using energy from the energy system 150, including but not limited to powering the wheels 130.

In addition to the energy system 150 and the propulsion system 152, the vehicle systems 140 include a braking system 154, a steering system 156 and a backup system 158. The braking system 154 is operable to perform one or more braking functions, including but not limited to frictionally braking the vehicle 100. The steering system 156 is operable to perform one or more steering functions, including but not limited to steering the vehicle 100. The backup system 158 is operable to perform one or more backup functions, including but not limited to, during backup events, adding rear visibility and, in relation to the rear visibility, issuing steering guidance.

Among the energy elements of the energy system 150, the vehicle 100 includes a fuel tank 160. The fuel tank 160 is operable to store fuel. Among the propulsion elements of the propulsion system 152, the vehicle 100 includes an engine 162. The engine 162 is fluidly connected to the fuel tank 160. Moreover, in the drivetrain, any penultimate combination of the transmission 132, the drive shaft 134, the differential 136 and the like, to which the wheels 130 are mechanically connected, is mechanically connected to the engine 162. With the drivetrain thus mechanically connected to the engine 162 as part of the powertrain for the vehicle 100, the engine 162, in conjunction with the drivetrain, is operable to power the wheels 130 using fuel from the fuel tank 160. With the wheels 130 powered, the engine 162 is employable to accelerate the vehicle 100, maintain the speed of the vehicle 100 (e.g., on level or uphill ground) and otherwise drive the vehicle 100 along the ground G.

Among the braking elements of the braking system 154, the vehicle 100 includes one or more friction brakes 164 at one, some or all of the wheels 130. The wheels 130 are mechanically connected to the friction brakes 164. The friction brakes 164 are operable to frictionally brake the vehicle 100 at the wheels 130. Among the steering elements of the steering system 156, the vehicle 100 includes a user-operated steering wheel 166 on the dash assembly 108 or otherwise housed in the passenger compartment 102, as well as one or more steering mechanisms 168 at one, some or all of the wheels 130. The wheels 130 are mechanically connected to the steering mechanisms 168. The wheels 130 have an adjustable steering angle and, in response to a user's operation of the steering wheel 166, the steering mechanisms 168 are operable to adjust the steering angle. In a front-wheel steer arrangement, one steering system 156 is operable to adjust the steering angle of both front wheels 130. As a product of adjusting the steering angle, the steering mechanisms 168 are operable to steer the vehicle 100 as it drives along the ground G.

Among the backup elements of the backup system 158, the vehicle 100 includes an exterior, rear-facing camera 170, as well as an interior display 172. Although the vehicle 100, as shown, includes one camera 170 and one display 172 in the backup system 158, it will be understood that this disclosure is applicable in principle to otherwise similar vehicles including any combination of multiple cameras and multiple displays in the backup system 158.

The camera 170 is mounted to or otherwise supported by the rear end 114 of the body 110. In the vehicle 100, the camera 170 may be a "backup" camera, and dedicated to the backup system 158, or may be part of another perception system typical of vehicles. The camera 170 is operable to capture images, including but not limited to sequences of images. With the rear-facing arrangement of the camera 170, the camera 170 is operable to capture images of the area A behind the vehicle 100. For purposes of capturing images, the camera 170 includes one or more image sensors. The image sensors may be, or include, any combination of one or more photodetectors, one or more solid state photodetectors, one or more photodiodes and one or more photomultipliers.

The display 172 is housed in the passenger compartment 102. In the vehicle 100, the display 172 may be part of an infotainment system typical of vehicles, or dedicated to the backup system 158. The display 172 may be part of, mounted to or otherwise supported by the dash assembly 108. Alternatively, the display 172 may be a heads-up display. The display 172 is operable to display various items. For instance, the display 172 is operable to display items using images thereof. Relatedly, with the rear-facing arrangement of the camera 170, the display 172 is operable to display the area A behind the vehicle 100 using captured images thereof from the camera 170. As the combined product of capturing images of the area A behind the vehicle 100, and using them to display the area A behind the vehicle 100, the camera 170 and the display 172 are operable to add rear visibility. Moreover, in relation to the rear visibility, the display 172 is operable to issue steering guidance.

Sensor System.

As part of the sensor system 142, the vehicle 100 includes one or more onboard sensors. The sensors monitor the vehicle 100 in real-time. The sensors, on behalf of the sensor system 142, are operable to detect information about the vehicle 100, including information about user requests and information about the operation of the vehicle 100.

The vehicle 100 includes user controls, including but not limited to the steering wheel 166. The user controls serve as interfaces between users of the vehicle 100 and the vehicle 100 itself, and are operable to receive mechanical, verbal and other user inputs requesting vehicle functions. In conjunction with corresponding user controls, and among the sensors, the vehicle 100 includes a transmission gear selector sensor, an accelerator pedal sensor, a brake pedal sensor, a steering wheel sensor and the like. Relatedly, among information about user requests, the sensor system 142 is operable to detect user inputs requesting switching transmission gears, powering the wheels 130 and the like, and user inputs requesting braking the vehicle 100, steering the vehicle 100 and the like.

Also among the sensors, the vehicle 100 includes one or more speedometers, one or more gyroscopes, one or more accelerometers, one or more inertial measurement units (IMUs), one or more transmission sensors, one or more wheel sensors, one or more steering sensors, one or more controller area network (CAN) sensors and the like. Relatedly, among information about the operation of the vehicle 100, the sensor system 142 is operable to detect the location and motion of the vehicle 100, including its speed, acceleration, orientation, rotation, direction and the like, the transmission gear of the transmission 132, the movement of the wheels 130, the steering angle, and the operational statuses of one, some or all of the vehicle systems 140.

Control Module.

As noted above, the processors 144, the memory 146 and the control module 148 together serve as a computing device whose control module 148 orchestrates the operation of the vehicle 100, including but not limited to the operation of the vehicle systems 140. The control module 148 may be a global control module. Relatedly, as part of a central control system, the vehicle 100 may include a global control unit (GCU) to which the control module 148 belongs. Although the vehicle 100, as shown, includes one control module 148, it will be understood that this disclosure is applicable in principle to otherwise similar vehicles including multiple control modules.

The processors 144 may be any components configured to execute any of the processes described herein or any form of instructions to carry out such processes or cause such processes to be performed. The processors 144 may be implemented with one or more general-purpose or special-purpose processors. Examples of suitable processors 144 include microprocessors, microcontrollers, digital signal processors or other forms of circuitry that execute software. Other examples of suitable processors 144 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 144 may include at least one hardware circuit (e.g., an integrated circuit) configured to carry out instructions contained in program code. In arrangements where there are multiple processors 144, the processors 144 may work independently from each other or in combination with one another.

The memory 146 is a non-transitory computer readable medium. The memory 146 may include volatile or nonvolatile memory, or both. Examples of suitable memory 146 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 146 includes stored instructions in program code. Such instructions are executable by the processors 144 or the control module 148. The memory 146 may be part of the processors 144 or the control module 148, or may be communicatively connected the processors 144 or the control module 148.

Generally speaking, the control module 148 includes instructions that may be executed by the processors 144. The control module 148 may be implemented as computer readable program code that, when executed by the processors 144, execute one or more of the processes described herein. Such computer readable program code may be stored on the memory 146. The control module 148 may be part of the processors 144, or may be communicatively connected the processors 144.

Operating the Backup System

The operations of a process 200 for operating the backup system 158 are shown in FIG. 2. According to the process 200, the control module 148 operates the display 172 during backup events to add rear visibility and, in relation to the rear visibility, issue steering guidance. The process 200 is described with reference to FIGS. 3A-3F, which are conceptual renderings of the display 172 when operated during a backup event according to the process 200. With the trailer T on the ground G behind the vehicle 100, the backup event, as shown, is a backup event whose purpose is leading the hitch point 122 to the trailer coupler C. However, it will be understood that this disclosure is applicable in principle to the operation of the display 172 during other backup events according to the process 200.

In operation 202, the control module 148 gathers information about the vehicle 100 for evaluation, including the steering angle and other information about the vehicle 100 detected by the sensor system 142. In operation 204, as part of its evaluation of the information about the vehicle 100, the control module 148 monitors for and identifies one or more backup events. When the control module 148 does not identify a backup event, it continues to monitor for backup events in anticipation that a backup event will materialize.

Otherwise, during the backup event, in operations 206 and 208, as a further part of its evaluation of the information about the vehicle 100, the control module 148 projects the motion of the vehicle 100 in preparation for the issuance of steering guidance. Moreover, in operations 210-218, the control module 148 operates the backup system 158 based on its evaluation of the information about the vehicle 100. Specifically, in operations 210 and 212, the control module 148 operates the backup system 158 to add rear visibility. In relation to the rear visibility, and based on the projected motion of the vehicle 100, in operations 214-218, the control module 148 operates the backup system 158 to issue steering guidance, including issuing general-purpose steering guidance, in operation 214, and issuing trailer-hitching steering guidance, in operations 216 and 218.

A backup event corresponds to the vehicle 100 evidently or prospectively driving backward along the ground G behind the vehicle 100. For instance, with the transmission 132 having the reverse transmission gear, the control module 148 may identify a backup event according to operation 204 when the sensor system 142 detects a user input requesting a switch to the reverse transmission gear, and otherwise not identify a backup event. Additionally, or alternatively, the control module 148 may identify a backup event according to operation 204 when the sensor system 142 detects the reverse transmission gear, and not identify a backup event when the sensor system 142 detects a forward transmission gear or otherwise does not detect the reverse transmission gear.

As noted above, by the operation of the steering system 156, the steering angle is adjustable. Specifically, the steering angle is adjustable between one or more on-center steering angles, one the one hand, and off-center steering angles toward either the left side of the vehicle 100 or the right side of the vehicle 100, on the other hand. In addition to a zero degree steering angle, the on-center steering angles may include a range of otherwise substantially head-on steering angles. From an on-center steering angle, the steering angle is adjustable to increasingly off-center steering angles, up to and including a full-lock off-center steering angle. Likewise, from an off-center steering angle, the steering angle is adjustable to decreasingly off-center steering angles, until returning to an on-center steering angle.

A backup event, in relation to corresponding to the vehicle 100 driving backward along the ground G behind the vehicle 100, is associated with the projected motion of the vehicle 100. In operations 206 and 208, leading from the vehicle 100, the control module 148 projects the motion of the vehicle 100. The motion of the vehicle 100 is projected based on the steering angle in conjunction with known relationships between the steering angles between which the steering angle is adjustable, on the one hand, and the resulting motion of the vehicle 100, on the other hand. Under the relationships, at an on-center steering angle, the projected motion of the vehicle 100, following a line along the longitudinal direction of the vehicle 100, is straight. And, at an off-center steering angle, the projected motion of the vehicle 100, following a turning circle with a tangent along the longitudinal direction of the vehicle 100, is curved.

According to operation 206, leading from the upright sides 112, the projected motion of the vehicle 100 includes the projected locus of the vehicle 100 or, in other words, the projected space occupied by the vehicle 100. According to operation 208, leading from the hitch point 122, the projected motion of the vehicle 100 includes the projected path of the hitch point 122.

In operation 210, the control module 148 operates the camera 170 to capture images of the area A behind the vehicle 100. As shown with additional reference to FIGS. 3A-3F, in operation 212, the control module 148 operates the display 172 to display the area A behind the vehicle 100 using captured images thereof from the camera 170. As the combined product of capturing images of the area A behind the vehicle 100 according to operation 210, and using them to display the area A behind the vehicle 100 according to operation 212, a user may view the area A behind the vehicle 100 on the display 172. From the perspective of the user, the camera 170 and the display 172 thus add rear visibility.

In relation to the area A behind the vehicle 100, in operation 214, the control module 148 operates the display 172 to display one or more general-purpose steering guidelines 300. Leading from the upright sides 112, the general-purpose steering guidelines 300 indicate the projected locus of the vehicle 100. The general-purpose steering guidelines 300 feature two elongate, laterally-spaced locus guidelines 300L respectively leading from the upright sides 112. In addition to the locus guidelines 300L, the general-purpose steering guidelines 300 feature one or more elongate, longitudinally-spaced proximity guidelines 300P across the locus guidelines 300L. As the product of displaying the general-purpose steering guidelines 300 according to operation 214, a user may visualize the projected locus of the vehicle 100 on the display 172 via the locus guidelines 300L. At the same time, in the projected locus of the vehicle 100, a user may visualize longitudinal proximities to the vehicle 100 on the display 172 via the proximity guidelines 300P. From the perspective of the user, displaying the general-purpose steering guidelines 300 thus serves to issue general-purpose steering guidance. Specifically, the general-purpose steering guidelines 300 inform a user's operation of the steering wheel 166 during the performance of backup events whose purposes are, for instance, relocating the vehicle 100 while avoiding obstacles.

Moreover, in operation 216, the control module 148 operates the display 172 to display an elongate, laterally-central trailer-hitching steering guideline 302. Leading from the hitch point 122, the trailer-hitching steering guideline 302 indicates the projected path of the hitch point 122. As the product of displaying the trailer-hitching steering guideline 302 according to operation 216, a user may visualize the projected path of the hitch point 122 on the display 172. From the perspective of the user, displaying the trailer-hitching steering guideline 302 thus serves to issue trailer-hitching steering guidance. Specifically, the trailer-hitching steering guideline 302 informs a user's operation of the steering wheel 166 during the performance of backup events whose purposes are leading the hitch point 122 to or otherwise toward a target location therefor, including the backup event whose purpose is leading the hitch point 122 to the trailer coupler C.

The area A behind the vehicle 100 is displayed as a scene. The scene has a field of view, including a vertical field of view and a horizontal field of view. In the vertical field of view, the scene includes a foreground FG, a horizon H behind the foreground FG, and a background BG behind the horizon H. From the foreground FG to the horizon H, the scene includes the ground G behind the vehicle 100, as well as the trailer T on the ground G behind the vehicle 100. The general-purpose steering guidelines 300 and the trailer-hitching steering guideline 302 are included in the scene as a superimposed virtual addition to the area A behind the vehicle 100. With the scene including the ground G behind the vehicle 100 from the foreground FG to the horizon H, the scene includes the general-purpose steering guidelines 300 and the trailer-hitching steering guideline 302 from the foreground FG toward the horizon H. Moreover, in the scene, the general-purpose steering guidelines 300 and the trailer-hitching steering guideline 302 extend over the ground G behind the vehicle 100.

With the general-purpose steering guidelines 300 extending over the ground G behind the vehicle 100, the general-purpose steering guidelines 300, as shown, are ground level or, in other words, substantially not elevated from the ground G behind the vehicle 100. Alternatively, the general-purpose steering guidelines 300 could, for instance, be bumper level or, in other words, elevated from the ground G behind the vehicle 100 to the level of the bumper 116. With the general-purpose steering guidelines 300 leading from the upright sides 112, in conjunction with the general-purpose steering guidelines 300, the scene includes the rearmost portions of the upright sides 112 in the foreground FG.

The locus guidelines 300L outline the projected locus of the vehicle 100. Each locus guideline 300L has a head, at the upright sides 112, and a culminating tail. In the projected locus of the vehicle 100 outlined by the locus guidelines 300L, each proximity guideline 300P demarcates a longitudinal proximity to the vehicle 100. The proximity guidelines 300P include a near-most proximity guideline 300P demarcating a near proximity to the vehicle 100, an intermediate proximity guideline 300P demarcating an intermediate proximity to the vehicle 100, and a furthermost proximity guideline 300P demarcating a further proximity to the vehicle 100. The furthermost proximity guideline 300P crosses the locus guidelines 300L at their tails.

The trailer-hitching steering guideline 302 has a head, at the hitch point 122, and a culminating tail. With the trailer-hitching steering guideline 302 extending over the ground G behind the vehicle 100, the trailer-hitching steering guideline 302, as shown, is trailer coupler level or, in other words, elevated from the ground G behind the vehicle 100 substantially to the level of the trailer coupler C. Equally, with the trailer coupler C above the hitch point 122, the trailer-hitching steering guideline 302 is above hitch point level or, in other words, elevated from the hitch point 122. Although the level of the trailer coupler C could alternatively be uniquely identified by the control module 148 as part of its evaluation of the information about the vehicle 100, to save processing resources, the level of the trailer coupler C is an assumed distance above the hitch point 122. With the trailer-hitching steering guideline 302 leading from the hitch point 122, in conjunction with the trailer-hitching steering guideline 302, the scene includes the hitch point 122 in the foreground FG.

With the general-purpose steering guidelines 300 indicating the projected locus of the vehicle 100, and the trailer-hitching steering guideline 302 indicating the projected path of the hitch point 122, the general-purpose steering guidelines 300 and the trailer-hitching steering guideline 302 account for the projected motion of the vehicle 100. At an on-center steering angle, to account for the associated straight projected motion of the vehicle 100, the general-purpose steering guidelines 300 and the trailer-hitching steering guideline 302 are straight. And, at an off-center steering angle, to account for the associated curved projected motion of the vehicle 100, the general-purpose steering guidelines 300 and the trailer-hitching steering guideline 302 are curved.

The general-purpose steering guidelines 300 and the trailer-hitching steering guideline 302 have respective reaches. With the general-purpose steering guidelines 300 accounting for the projected motion of the vehicle 100, the reach thereof corresponds to how much of the projected motion of the vehicle 100 the general-purpose steering guidelines 300 account for. With the trailer-hitching steering guideline 302 accounting for the projected motion of the vehicle 100, the reach thereof corresponds to how much of the projected motion of the vehicle 100 the trailer-hitching steering guideline 302 accounts for. Among other things, it follows that setting the reach of the general-purpose steering guidelines 300 or the reach of the trailer-hitching steering guideline 302 to increasingly longer reaches corresponds to the general-purpose steering guidelines 300 or the trailer-hitching steering guideline 302, as the case may be, accounting for increasingly more of the projected motion of the vehicle 100. Likewise, setting the reach of the general-purpose steering guidelines 300 or the reach of the trailer-hitching steering guideline 302 to increasingly shorter reaches corresponds to the general-purpose steering guidelines 300 or the trailer-hitching steering guideline 302, as the case may be, accounting for decreasingly less of the projected motion of the vehicle 100.

In anticipated use cases for backup events whose purposes are relocating the vehicle 100 while avoiding obstacles, the backup events are performed within relatively tight spaces in, for instance, the relatively tight confines of parking lots, garages, driveways and the like. It is contemplated that, during the backup events, setting the reach of the general-purpose steering guidelines 300 to increasingly longer reaches may not promote the purpose of informing a user's operation of the steering wheel 166 commensurately with the tradeoff of increasingly obfuscating the area A behind the vehicle 100.

Accordingly, for purposes of informing a user's operation of the steering wheel 166 during the backup events, the general-purpose steering guidelines 300 have a reach that is substantially constant or otherwise maintained regardless of the steering angle. Specifically, the reach of the general-purpose steering guidelines 300 is set to a standard reach. From an on-center steering angle, the standard reach of the general-purpose steering guidelines 300 is maintained at increasingly off-center steering angles, up to and including a full-lock off-center steering angle. Likewise, from an off-center steering angle, the standard reach of the general-purpose steering guidelines 300 is maintained at decreasingly off-center steering angles, including a return to an on-center steering angle.

On the other hand, in anticipated use cases for backup events whose purposes are leading the hitch point 122 toward a target location therefor, the backup events are performed within relatively expansive spaces in, for instance, the relatively expansive confines of boatyards, recreational areas and the like. It is contemplated that, during the backup events, setting the reach of the trailer-hitching steering guideline 302 to increasingly longer reaches may promote the purpose of informing a user's operation of the steering wheel 166 commensurately with the tradeoff of obfuscating the area A behind the vehicle 100. Specifically, from the reach set at an on-center steering angle, setting the reach of the trailer-hitching steering guideline 302 to increasingly longer reaches at increasingly off-center steering angles may promote the purpose of informing a user's operation of the steering wheel 166 commensurately with the tradeoff of obfuscating the area A behind the vehicle 100.

Accordingly, for purposes of informing a user's operation of the steering wheel 166 during the backup events, the trailer-hitching steering guideline 302 has a reach that is adjustable based on the steering angle. Relatedly, as a prerequisite to displaying the trailer-hitching steering guideline 302 according to operation 216, in operation 218, the control module 148 sets the reach of the trailer-hitching steering guideline 302 based on the steering angle. Specifically, according to operation 218, at an on-center steering angle, the reach of the trailer-hitching steering guideline 302 is set to a baseline reach. From the baseline reach set at an on-center steering angle, the reach of the trailer-hitching steering guideline 302 is set to progressively, stepwise or otherwise increasingly longer reaches at increasingly off-center steering angles, up to and including a full reach at a full-lock off-center steering angle. Likewise, from the reach set at an off-center steering angle, the reach of the trailer-hitching steering guideline 302 is set to progressively, stepwise or otherwise decreasingly shorter reaches at decreasingly off-center steering angles, including a return to the baseline reach at an on-center steering angle.

As noted above, FIGS. 3A-3F are conceptual renderings of the display 172 when operated during the backup event whose purpose is leading the hitch point 122 to the trailer coupler C according to the process 200. As a representative example of an anticipated use case for backup events whose purposes are leading the hitch point 122 toward a target location therefor, the backup event is performed within a relatively expansive space.

As informed by the trailer-hitching steering guideline 302, at the outset of the backup event, FIGS. 3A-3D reflect a user's realization of the correct steering angle for completing the backup event via operation of the steering wheel 166. With FIG. 3A reflecting the realization of an on-center steering angle, FIGS. 3B-3D reflect the progressive realization of a slight off-center steering angle, a sharp off-center steering angle and a full-lock off-center steering angle, respectively. Relatedly, based on the changing steering angles, the trailer-hitching steering guideline 302 is displayed with an adjusted reach. Specifically, from the baseline reach at the on-center steering angle, the trailer-hitching steering guideline 302 is displayed with an increasingly longer reach at the increasingly off-center steering angles, up to and including the full reach at the full-lock off-center steering angle. Meanwhile, the general-purpose steering guidelines 300 are displayed with the standard reach regardless of the changing steering angles.

Generally speaking, given the performance of the backup event within a relatively expansive space, a user's realization of the correct steering angle would be increasingly difficult at increasingly off-center steering angles. However, at increasingly off-center steering angles, commensurately with the increasing difficulty, the trailer-hitching steering guideline 302 is displayed with an increasingly longer reach. And, at the same time, leading from the hitch point 122, the trailer-hitching steering guideline 302 does not markedly obfuscate the area A behind the vehicle 100.

Figure 3A:
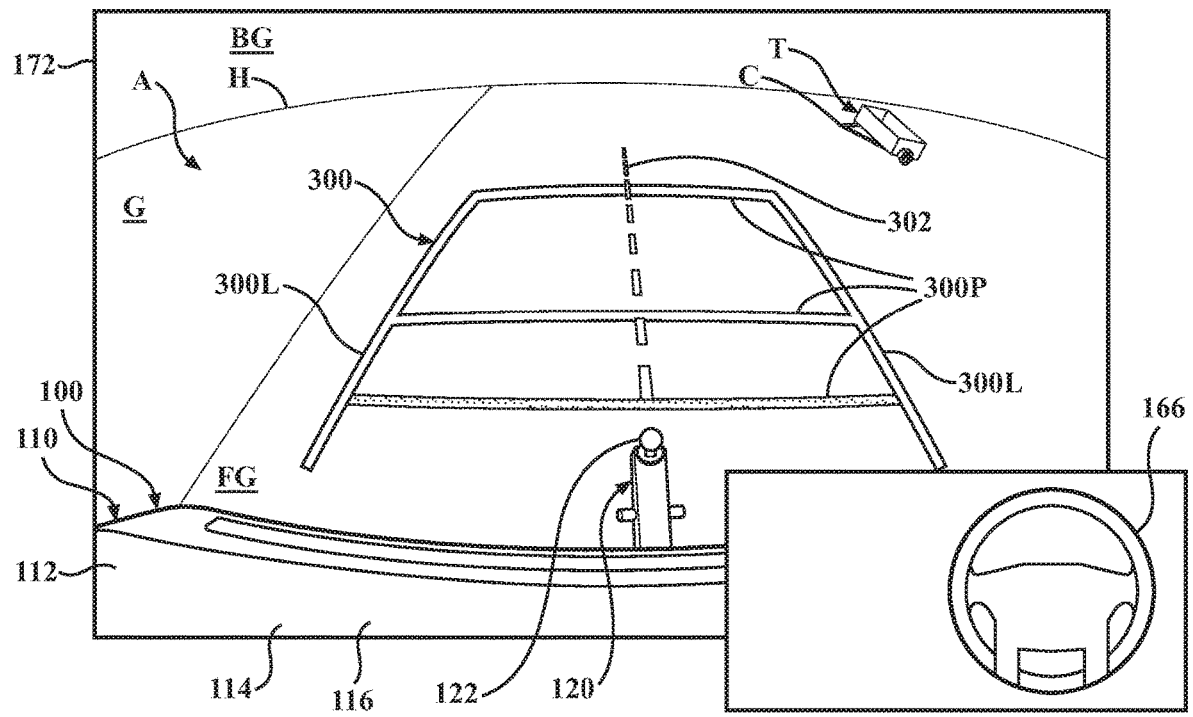
FIGS. 3A-3F are conceptual renderings of the display when operated during a backup event according to the process of FIG. 2, showing the display displaying the area behind the vehicle and, in relation to the area behind the vehicle, displaying an adjustable-reach trailer-hitching steering guideline.
Figure 3B:
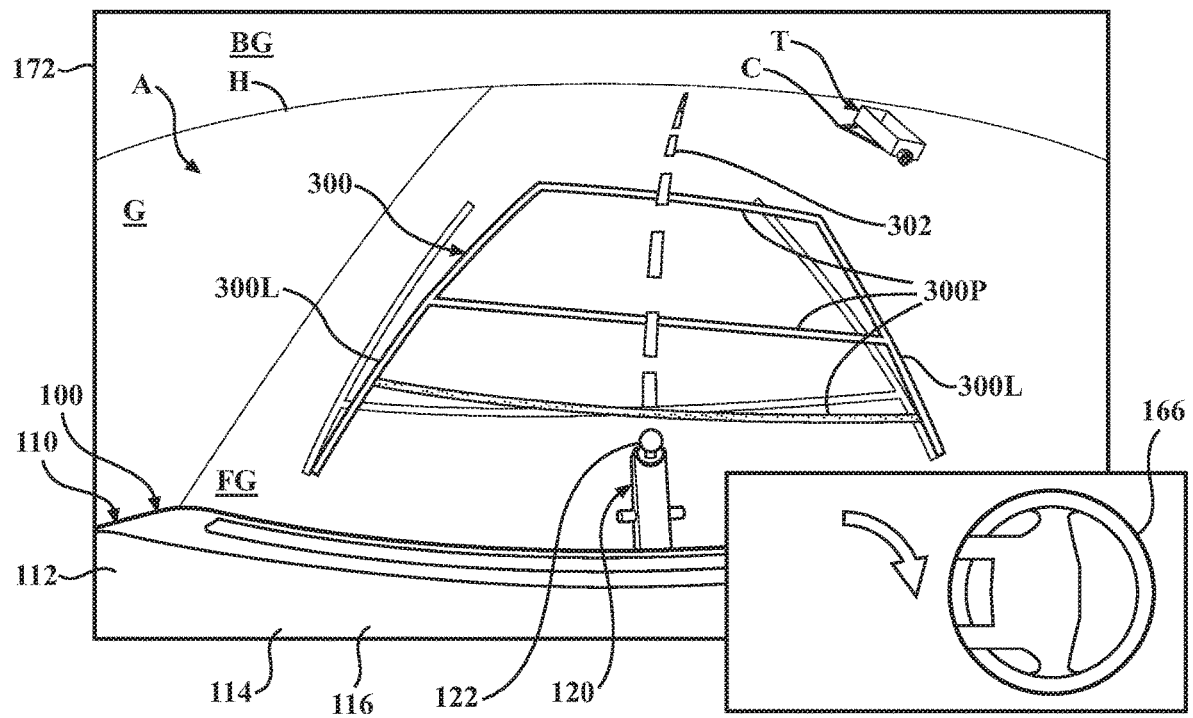
Figure 3C:
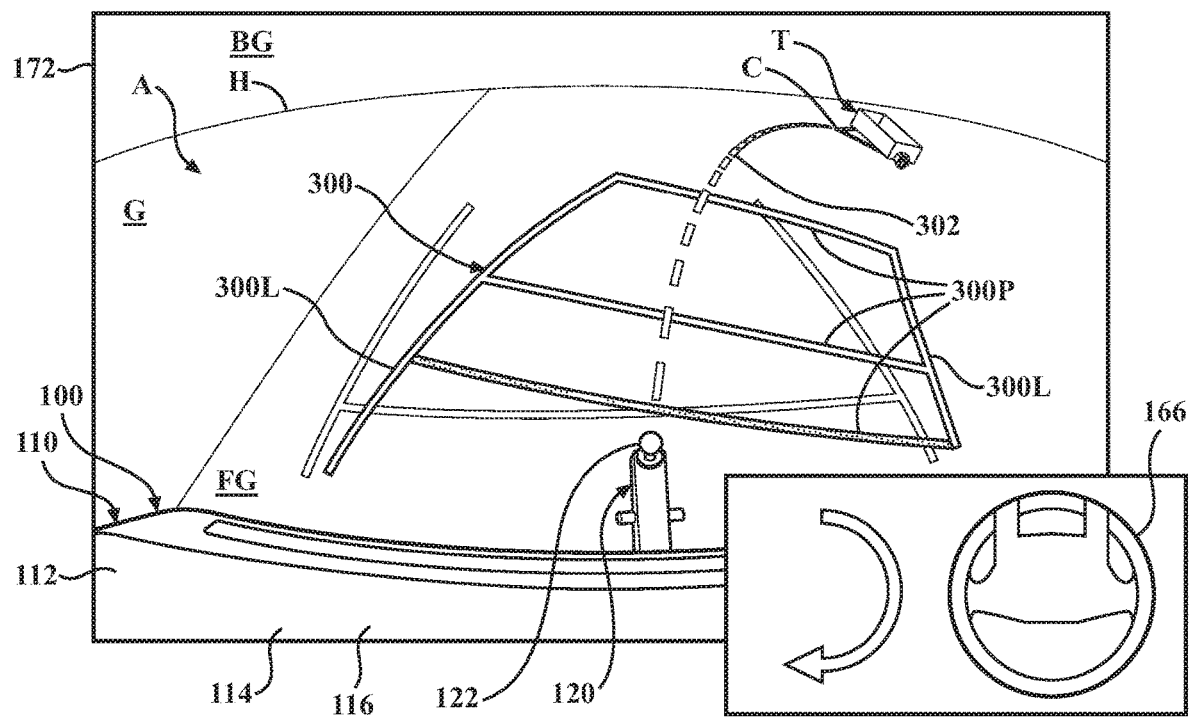
Figure 3D:
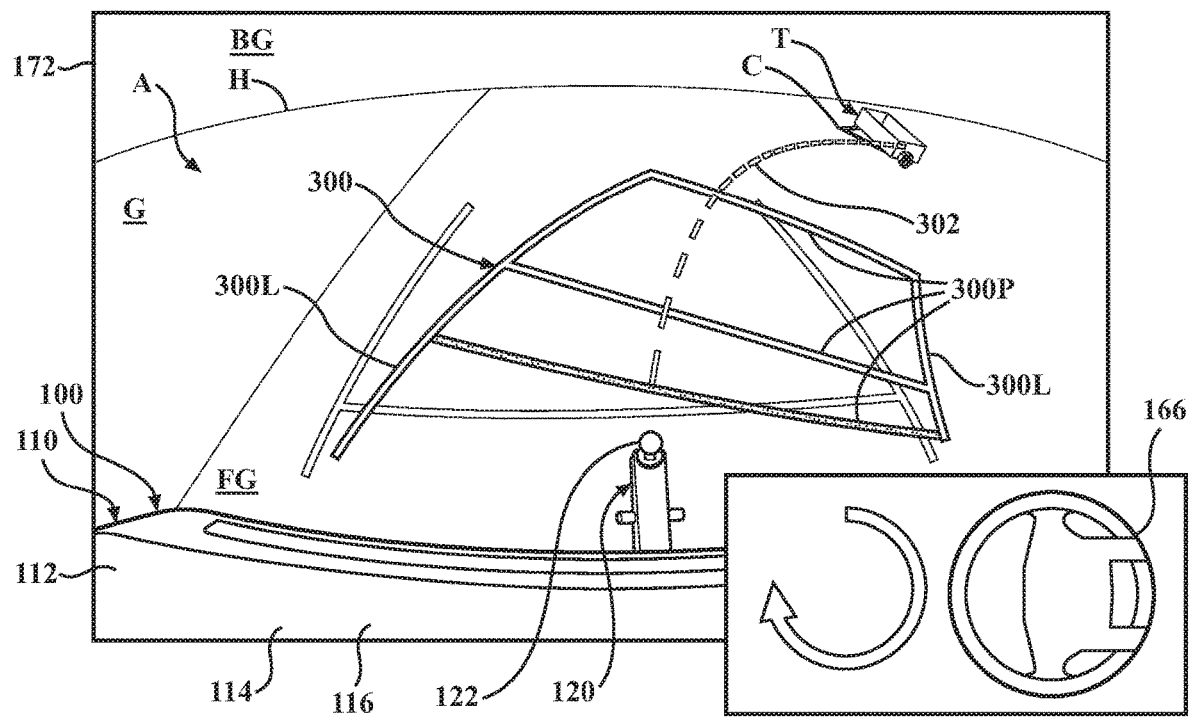
Figure 3E:
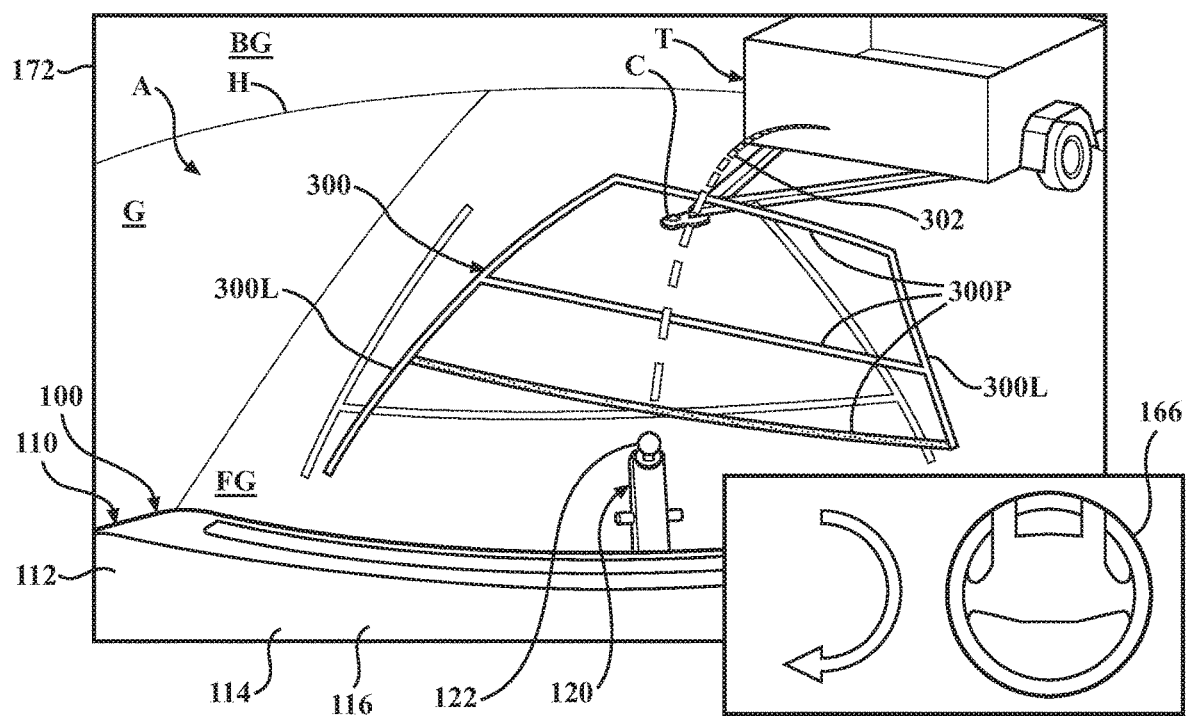
Figure 3F:
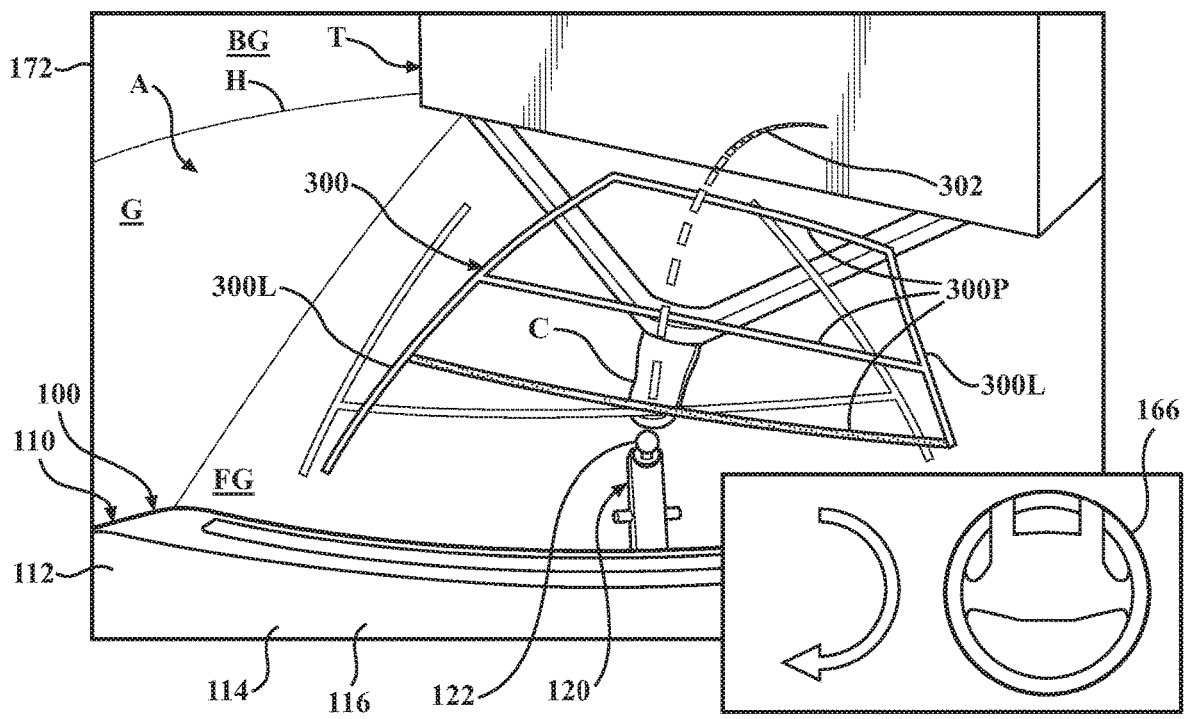

Relatedly, as shown, FIG. 3C reflects the straightforward realization of the sharp off-center steering angle as the correct steering angle. As opposed to its straightforward realization as informed by the adjustable-reach trailer-hitching steering guideline 302, the realization of the sharp off-center steering angle as the correct steering angle would have been more difficult if informed, for instance, by the trailer-hitching steering guideline 302 with the baseline reach. With FIG. 3C reflecting the realization of the sharp off-center steering angle as the correct steering angle at the outset of the backup event, for the remainder of the backup event, FIGS. 3E and 3F reflect a user's maintenance of the correct steering angle via operation of the steering wheel 166. With FIGS. 3E and 3F reflecting a user's maintenance of the correct steering angle, the hitch point 122 is lead directly toward and ultimately to the trailer coupler C for mechanical connection therewith.

As shown, the baseline reach of the trailer-hitching steering guideline 302 is longer than the standard reach of the general-purpose steering guidelines 300. The full reach of the trailer-hitching steering guideline 302, being longer than the baseline reach of the trailer-hitching steering guideline 302, is longer than the standard reach of the general-purpose steering guidelines 300 as well. Relatedly, from the perspective of projection onto the ground G, the baseline reach of the trailer-hitching steering guideline 302 may, for instance, be at least 1.5 times longer than the standard reach of the general-purpose steering guidelines 300. Moreover, the full reach of the trailer-hitching steering guideline 302 may, for instance, be at least 2 times longer than the baseline reach of the trailer-hitching steering guideline 302, and at least 3 times longer than the standard reach of the general-purpose steering guidelines 300.

In one implementation, from the perspective of projection onto the ground G, the standard reach of the general-purpose steering guidelines 300 is an approximately 2.5 meter reach, the baseline reach of the trailer-hitching steering guideline 302 is an approximately 4 meter reach, and the full reach of the trailer-hitching steering guideline 302, accounting for a projected approximately 7 meter radius quarter turn of the vehicle 100, is an approximately 11 meter reach. Relatedly, the baseline reach of the trailer-hitching steering guideline 302 is approximately 1.6 times longer than the standard reach of the general-purpose steering guidelines 300. Moreover, the full reach of the trailer-hitching steering guideline 302 is approximately 2.75 times longer than the baseline reach of the trailer-hitching steering guideline 302, and approximately 4.4 times longer than the standard reach of the general-purpose steering guidelines 300.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
   upright sides;
   a hitch point between the upright sides;
   an interior display; and
   a control module communicatively connected with the display, the control module configured to, in response to a backup event, operate the display during the backup event to display:
      an area behind the vehicle;
      general-purpose steering guidelines, the general-purpose steering guidelines leading from the upright sides, indicating a projected locus of the vehicle, and having a lengthwise reach that is maintained regardless of changing steering angles; and
      a trailer-hitching steering guideline, the trailer-hitching steering guideline leading from the hitch point, indicating a projected path of the hitch point, and having a lengthwise reach that is adjusted based on changing steering angles.

2. The vehicle of claim 1, wherein the trailer-hitching steering guideline has, from a baseline lengthwise reach at an on-center steering angle, an increasingly longer lengthwise reach at increasingly off-center steering angles, including a full lengthwise reach at a full-lock off-center steering angle, and the full lengthwise reach of the trailer-hitching steering guideline accounts for a projected quarter turn of the vehicle.

3. The vehicle of claim 1, wherein the trailer-hitching steering guideline has, from a baseline lengthwise reach at an on-center steering angle, an increasingly longer lengthwise reach at increasingly off-center steering angles, including a full lengthwise reach at a full-lock off-center steering angle, and the full lengthwise reach of the trailer-hitching steering guideline is at least 2 times longer than the baseline lengthwise reach of the trailer-hitching steering guideline.

4. The vehicle of claim 1, wherein at increasingly off-center steering angles, the general-purpose steering guidelines have a standard lengthwise reach, and the trailer-hitching steering guideline has an increasingly longer lengthwise reach.

5. The vehicle of claim 1, wherein the general-purpose steering guidelines feature elongate, laterally-spaced locus guidelines, the locus guidelines respectively leading from the upright sides, and outlining the projected locus of the vehicle.

6. The vehicle of claim 1, wherein the trailer-hitching steering guideline is elevated an assumed distance above the hitch point.

7. A backup system for a vehicle with a trailer hitch, comprising:
   at least one processor; and
   a memory communicatively coupled to the at least one processor and storing:
      a control module including instructions that when executed by the at least one processor cause the at least one processor to:
         monitor for backup events in a vehicle with upright sides and a hitch point between the upright sides; and
         in response to identifying a backup event, operate an interior display in the vehicle during the backup event to display:
            an area behind the vehicle;
            general-purpose steering guidelines, the general-purpose steering guidelines leading from the upright sides, indicating a projected locus of the vehicle, and having a lengthwise reach that is maintained regardless of changing steering angles; and
            a trailer-hitching steering guideline, the trailer-hitching steering guideline leading from the hitch point, indicating a projected path of the hitch point, and having a lengthwise reach that is adjusted based on changing steering angles.

8. The backup system of claim 7, wherein the trailer-hitching steering guideline has, from a baseline lengthwise reach at an on-center steering angle, an increasingly longer lengthwise reach at increasingly off-center steering angles, including a full lengthwise reach at a full-lock off-center steering angle, and the full lengthwise reach of the trailer-hitching steering guideline accounts for a projected quarter turn of the vehicle.

9. The backup system of claim 7, wherein the trailer-hitching steering guideline has, from a baseline lengthwise reach at an on-center steering angle, an increasingly longer lengthwise reach at increasingly off-center steering angles, including a full lengthwise reach at a full-lock off-center steering angle, and the full lengthwise reach of the trailer-hitching steering guideline is at least 2 times longer than the baseline lengthwise reach of the trailer-hitching steering guideline.

10. The backup system of claim 7, wherein at increasingly off-center steering angles, the general-purpose steering guidelines have a standard lengthwise reach, and the trailer-hitching steering guideline has an increasingly longer lengthwise reach.

11. The backup system of claim 7, wherein the general-purpose steering guidelines feature elongate, laterally-spaced locus guidelines, the locus guidelines respectively leading from the upright sides, and outlining the projected locus of the vehicle.

12. The backup system of claim 7, wherein the trailer-hitching steering guideline is elevated an assumed distance above the hitch point.

13. A vehicle, comprising:
   upright sides;
   a hitch point between the upright sides;
   an interior display; and
   a control module communicatively connected with the display, the control module configured to, in response to a backup event, operate the display during the backup event to display:
      an area behind the vehicle; and
      a trailer-hitching steering guideline, the trailer-hitching steering guideline leading from the hitch point, indicating a projected path of the hitch point, and having, from a baseline lengthwise reach at an on-center steering angle, an increasingly longer lengthwise reach at increasingly off-center steering angles.

14. The vehicle of claim 13, wherein the increasingly longer lengthwise reach of the trailer-hitching steering guideline at the increasingly off-center steering angles includes a full lengthwise reach at a full-lock off-center steering angle, and the full lengthwise reach of the trailer-hitching steering guideline accounts for a projected quarter turn of the vehicle.

15. The vehicle of claim 13, wherein the increasingly longer lengthwise reach of the trailer-hitching steering guideline at the increasingly off-center steering angles includes a full lengthwise reach at a full-lock off-center steering angle, and the full lengthwise reach of the trailer-hitching steering guideline is at least 2 times longer than the baseline lengthwise reach of the trailer-hitching steering guideline.

16. The vehicle of claim 13, wherein the trailer-hitching steering guideline is elevated an assumed distance above the hitch point.

* * * * *